United States Patent [19]
Wulbrecht et al.

[11] 3,910,596
[45] Oct. 7, 1975

[54] INFLATION APPARATUS FOR SAFETY DEVICE

[75] Inventors: Robert M. Wulbrecht, Utica; Robert J. Bishop, Rochester, both of Mich.

[73] Assignee: Allied Chemical Corporation, New York, N.Y.

[22] Filed: June 1, 1973

[21] Appl. No.: 365,906

[52] U.S. Cl. ............... 280/150 AB; 137/68; 222/5
[51] Int. Cl.² ......................................... B60R 21/10
[58] Field of Search ............. 280/150 AB; 222/3, 5; 137/68, 67

[56] References Cited
UNITED STATES PATENTS

| | | | |
|---|---|---|---|
| 3,642,304 | 2/1972 | Johnson et al. | 280/150 AB |
| 3,655,217 | 11/1972 | Johnson | 280/150 AB |
| 3,773,353 | 11/1973 | Trowbridge et al. | 280/150 AB |
| 3,774,807 | 11/1973 | Keathley et al. | 222/5 |

*Primary Examiner*—Kenneth H. Betts
*Attorney, Agent, or Firm*—Ernest D. Buff; Jonathan Plaut

[57] ABSTRACT

Inflation apparatus adapted to be disposed in a vehicle for inflating a bag with hybrid gas upon impact of the vehicle is provided with gas releasing means having plural gas releasing features which function separately or collectively to inflate the bag in a highly reliable manner. The apparatus is easy to fabricate and monitor and is more reliable in operation than inflation apparatus wherein release of gas is effected by electroexplosive, mechanical or pressure responsive gas releasing mechanisms solely.

10 Claims, 1 Drawing Figure

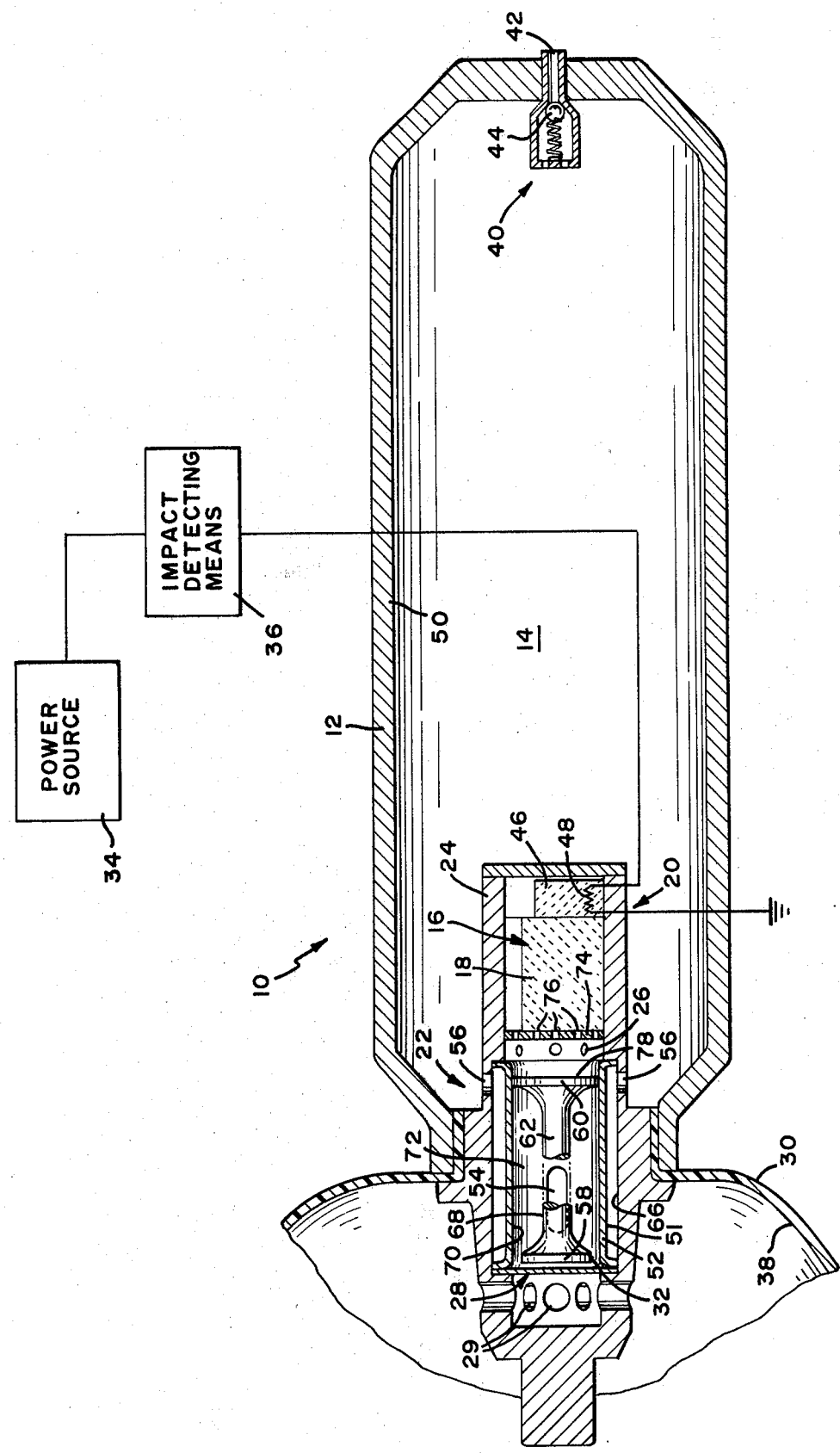

INFLATION APPARATUS FOR SAFETY DEVICE

BACKGROUND OF THE INVENTION

1. Field of the Invention

This invention relates to safety apparatus for passengers or other mobile objects of a motor vehicle, such as an automobile, and more particularly to apparatus for inflating a bag with gas upon collision of the vehicle.

2. Description of the Prior Art

Inflatable bag restraint systems have been recently developed which should significantly decrease the number of fatalities and serious injuries resulting from motor vehicle accidents. Such systems may include a gas source containing pressurized gas and gas generating material disposed within a vehicle and a gas releasing mechanism connected to the gas source for creating an outlet therein when the vehicle is involved in a collision. The outlet communicates with an inflatable bag. Gas flows from the gas source through the outlet and into the bag, which is rapidly inflated by the gas. It is obviously of prime importance that the release of inflating gas be reliably effected if a collision of the vehicle occurs.

SUMMARY OF THE INVENTION

The present invention provides a bag inflation apparatus wherein the gas releasing means has plural gas releasing features which function independently to effect release of inflating gas in a highly reliable manner. The apparatus is adapted to be disposed in a vehicle subject to impact and operates to inflate the bag upon receipt of an electrical current from an impact detecting means responsive to impact of the vehicle.

Briefly stated, the inflation apparatus has a gas containing means provided with a pressurized gas, gas generating means provided with gas generating material, actuating means for igniting the gas generating material upon receipt of an electrical current to form a generated gas and gas releasing means associated with the gas contained means for effecting release of the pressurized and generated gases. The gas releasing means may comprise housing means containing the gas generating material and having an aperture therein for permitting communication between the gas generating material and the pressurized gas, outlet means in communication with the pressurized gas and an inflatable bag and adapted to rupture when pressure within the gas containing means exceeds a predetermined pressure and mechanical means disposed in the housing means between the outlet means and the gas generating material for rupturing the outlet means upon ignition of the gas generating material, whereby gas released from the gas containing means and from the gas generating means flows into and inflates the bag. The term "aperture", referred to above, is intended to include a plurality of apertures as well as a single aperture.

When a vehicle equipped with the inflation apparatus is involved in a collision, an impact detecting means transmits an electrical current from a source of electrical power to the actuating means. The actuating means ignites the gas generating material and generated gas drives the mechanical means forward to rupture the outlet means and provide an outlet in the gas containing means. Simultaneously, generated gas is introduced into the reservoir wherein it becomes admixed with the pressurized gas. The combined pressurized and generated gases pass through the outlet and into the bag, which is rapidly inflated by the gases. In the event that the mechanical means does not properly operate to rupture the outlet means, the pressure within the gas containing means is rapidly increased above the preselected minimum pressure by introduction of the generated gas. The outlet means ruptures in response to the increased gas pressure, whereby the combined pressurized and generated gases are released from the gas containing means and flow into the bag in the manner previously described.

The inflation apparatus of this invention is easy to fabricate and is less subject to failure than inflation apparatus wherein the outlet means is ruptured by increased gas pressure or mechanical means solely. In addition, it is more easily monitored than apparatus wherein the outlet means is ruptured by electroexplosive means. As a result, the inflation apparatus of the present invention is safer and more reliable in operation than apparatus having a single electroexplosive, mechanical or pressure responsive gas release mechanism.

BRIEF DESCRIPTION OF THE DRAWINGS

The invention will be more fully understood and further advantages will become apparent when reference is made to the following description and the accompanying drawing, which is a longitudinal section through one form of an inflation apparatus incorporating the present invention.

DESCRIPTION OF THE PREFERRED EMBODIMENTS

Referring to the drawing, there is illustrated a preferred form of an inflation apparatus incorporating the gas releasing means of the present invention. Other forms of the inflation apparatus can also be used. The inflation apparatus, shown generally at 10, should therefore be interpreted as illustrative and not in a limiting sense. As illustrated, the inflation apparatus 10 has a gas containing means 12 provided with a pressurized gas 14 and a gas generating means 16 provided with a gas generating material 18, an actuating means, shown generally at 20, for initiating the generation of gas within the gas generating means 16 and a gas releasing means, shown generally at 22, for releasing gas from the gas containing means 12. The gas releasing means 22 has a housing means 24 which contains the gas generating material 18. Housing means 24 has a plurality of apertures 26 therein for permitting communication between the gas generating material 18 and the pressurized gas 14. An outlet means, shown generally at 28, is provided in the housing means 24. The outlet means 28 is in communication with the pressurized gas 14 and with a plurality of passageways 29 leading to the interior of an inflatable bag 30, and is adapted to rupture when the pressure within the gas containing means 12 exceeds a predetermined pressure. A mechanical means 32, such as a piston, is disposed in the housing means 24 between the outlet means 28 and the gas generating material 18. The mechanical means 32 is adapted to rupture the outlet means 28 when generation of gas is initiated. An electrical current supplied by an electrical power source 34 is directed to the actuating means 20 by an impact detecting means 36 of a vehicle in which the apparatus is disposed. The actuating means 20 ignites the gas generating material 18 upon receipt of the electrical current.

An outlet (not shown) is provided in the housing means by the gas releasing means 22, which places the gas containing means 12 in communication with the interior 38 of the inflatable bag 30. Gas discharged from the gas containing means 12 and the gas generating means 16 passes through the outlet and into the bag 30 which is rapidly inflated by the gas.

The gas containing means 12 includes a gas inlet means shown generally at 40. Gas inlet means 40 may comprise a tapped hole 42 adapted to communicate with a source of pressurized gas (not shown) and a ball check valve 44. The use of the check valve 44 is preferred in order to prevent back flow of the pressurized gas 14. As illustrated, the gas inlet means 40 is disposed at the upstream end of the gas containing means 12. It should be appreciated that this position of the inlet means 40 is optional and that in other forms of the inflation apparatus 10 the inlet means 40 may be in other positions on the gas containing means 12. The gas containing means 12 is filled by injecting a pressurized gas 14 through the gas inlet means 40 until a preselected pressure is attained within the gas containing means 12. Nitrogen, air or other suitable gas which is not toxic to humans, does not have a deleterious effect on the inflatable bag 30, and can be stored for prolonged periods without leaking from the gas containing means 12 is generally used as the pressurized gas 14. The pressurized gas 14 is normally contained within the gas containing vessel at a pressure in the range of about 1000 to 4000 pounds per square inch, and preferably at about 2000 pounds per square inch. In order to accommodate such pressure, the gas containing means 12 has a volume in the range of about 50 to about 150 cubic inches, and preferably about 100 cubic inches. Pressures exerted within the gas containing means 12 by admixture of the pressurized (stored) and generated gases may increase the pressure in the gas containing means 12 to a pressure in the range of about 3000–5000 psi or more.

The gas generating means 16 may contain the actuating means 20, including a squib 46. Squib 46 is structurally connected to a resistance element, such as a bridge wire 48, which will produce a suitable volume of resistivity to heat and ignite the squib 46 upon passage of an electrical current therethrough. The bridge wire 48 is electrically connected to impact detecting means 36, which is adapted to transmit an electrical current from power source 34 to bridge wire 48 upon impact of a vehicle in which inflation apparatus 10 is disposed. The gas generating means is provided with a gas generating material 18 disposed adjacent to the squib 46. Single base propellant such as nitrocellulose, composite propellant such as ammonium perchlorate and polyvinyl chloride, or other propellant material which generates gas and heat upon combustion can be used as the gas generating material 18.

The volume and pressure of the pressurized gas 14 selected will depend upon the volume of the inflatable bag, and the pressure and volume of gas produced by the gas generating material 18. In the embodiment shown in the drawing, the volume and pressure of the pressurized gas 14 is at least about 25 percent of the volume and pressure of gas generated by combustion of the gas generating material 18. The volume of gas stored within the gas containing means can be varied in order to maximize the high pressure gas potential and minimize the volume of the gas source. In a preferred embodiment of the invention, the pressurized gas 14 is stored within the gas containing means 12 at sufficient pressure and volume to substantially fill the bag 30.

Because of the pressures which are maintained within the gas containing means 12, the latter is provided with a relatively thick casing 50. The thickness of the casing 50 is designed so as to insure the structural integrity thereof if the casing 50 is subjected to pressures in excess of those anticipated. Preferably, the casing 50 is constructed of heat treated steel or other suitable metal.

The gas releasing means 22 can be constructed in a variety of configurations which afford sufficient structural capacity to withstand the pressures exerted thereon during generation and release of the gas. In the embodiment illustrated herein, the gas releasing means has a housing means 24 adapted to contain the generating means 16, the mechanical means 32 and the outlet means 28. The housing means 24 is constructed of heat treated steel or other suitable metal and has a substantially cylindrical configuration. As shown in the drawing, the housing means 24 is provided with a plurality of apertures 26, although, as previously noted, a single aperture may be used. The apertures 26 preferably are of substantially equal diameter and circumferentially spaced around the housing means 24 at substantially equal intervals. This arrangement of the apertures 26 minimizes the net force applied to housing means 24 during passage of generated gas through aperture 26. In order to provide for communication between the outlet means 32 and the pressurized gas 14, housing means 24 may include an inner cylinder 52 having an elongated aperture 54 therein and a diameter smaller than the diameter of the housing means 24. The elongated aperture 54 communicates with the mechanical means 32 and with the pressurized gas 14 through an aperture 56 in the housing means 24. Mechanical means 32 may include a piston having a first end 58 disposed adjacent to the outlet means, a second end 60 disposed adjacent to the gas generating means 16 and a shaft 62 structurally connected to and having a diameter smaller than the first and second ends 58 and 60, respectively. Sufficient space is provided between the exterior surface 51 of the cylinder 52 and the interior surface 66 of housing means 24, and between the exterior surface 68 of shaft 62 and the interior surface 70 of cylinder 52 to form a conduit 72 through which gas can be passed. The outlet means 28 communicates with the pressurized gas 14 in gas containing means 12 through the conduit 72. Each of ends 58 and 60 of mechanical means 32 has its peripheral portion in frictional engagement with the interior surface 70 of inner cylinder 52, whereby the shaft 62 is slidably disposed within the housing means 24.

The size of the opening collectively provided by apertures 26 will depend upon the amount and type of pressurized and generated gases used and the construction of mechanical means 32 and outlet means 28, as would the size of the opening provided by a single aperture. Such opening should be small enough that generated gas is applied against end 60 of mechanical means 32 with sufficient force to drive it forward and through the outlet means 28. At the same time, the opening should be large enough that pressure within the gas containing means 12 is rapidly increased above the predetermined pressure and ruptures the disc in the event that the mechanical means 32 fails to do so. In the embodiment shown, the outlet means 28 is a nickel diaphragm about 0.75 to 1.25 inch in diameter by about 0.010 to 0.050 inch thick and is adapted to rupture when pressure in the gas containing means 12 exceeds a predetermined pressure of about 2000 to 6000 psi. Such a predetermined pressure is obtained within about 5 to 15 milliseconds after ignition of the gas generating means unless mechanical means 32 operates properly to rupture the outlet means 28. The mechanical means 32 is constructed of heat treated steel having an end diameter of about 0.6 to 1.0 inch and weighing about 1/3 to 2/3 pound, and is slidably disposed in inner cylinder 52 so as to require a differential pressure in excess of at least about 500 psi to drive it into rupturing engagement with the outlet means 28. Apertures 26 collectively provide an opening having a diameter of about 1 to 2.5 inches.

A diffuser 74 is disposed at the down-stream end of the gas generating means 16 and immediately upstream of apertures 26. The diffuser contains a plurality of passageways 76 which evenly distribute the pressure of the generated gas over surface 78 of end 60. In addition, the diffuser 74 causes gas generated within the gas generating means 16 to move into the gas containing means 12 at a uniform pressure and velocity.

The impact detecting means 36 may have a variety of configurations. One form of impact detecting means which is suitable is described in U.S. Pat. No. 3,688,063 to Bell. The power source 34 may be a primary or storage battery having an electrical potential of about 12 volts and typically comprises the storage battery of the vehicle.

In operation, the impact detecting means 36 transmits an electrical current from power source 34 to bridge wire 48 upon impact of a vehicle in which the inflation apparatus 10 is disposed. The bridge wire heats and ignites the squib 46 upon receipt of the electrical current. Squib 46 heats and ignites the gas generating material 18 and production of generated gas commences. The generated gas passes through diffuser 74 and impinges against end 60 of mechanical means 32, driving the latter forward to rupture the outlet means 28. Simultaneously, generated gas enters the gas containing means 12 through apertures 26 in housing means 24. The pressure within the gas containing means 12 is rapidly increased above the predetermined pressure and ruptures the outlet means 28 in the event that the mechanical means 32 has failed to do so. An outlet is thereby created in the gas containing means 12 and the combined pressurized and generated gases flow from the gas containing means 12 and conduit 72 through outlet means 28 and passageways 29 into the bag 30 which is rapidly inflated and disposed between hard portions of the vehicle and passengers or other mobile objects contained therein.

Having thus described the invention in rather full detail it will be understood that these details need not be strictly adhered to but that various changes and modifications may suggest themselves to one skilled in the art, all falling within the scope of the invention as defined by the subjoined claims.

We claim:

1. Inflation apparatus adapted to be disposed in a vehicle for inflating a bag upon receipt of an electrical current from an impact detecting means responsive to impact of the vehicle, comprising:

a. gas containing means provided with a pressurized gas;
    b. gas generating means provided with a gas generating material;
    c. actuating means for igniting the gas generating material and upon receipt of the electrical current to form a generated gas;
    d. gas releasing means associated with said gas containing means, comprising:
        i. housing means containing said gas generating material and having an aperture therein for permitting communication between said gas generating material and said pressurized gas;
        ii. outlet means in communication with said pressurized gas and with said inflatable bag, said outlet means being adapted to rupture when the pressure within the gas containing means exceeds a predetermined pressure; and
        iii. mechanical means disposed in said housing means between said outlet means and said gas generating material for rupturing said outlet means upon ignition of said gas generating material, whereby gas released from the gas containing means and from the gas generating means flows into and inflates the bag.

2. Inflation apparatus as recited in claim 1, wherein said housing means is a unitary structure.

3. Inflation apparatus as recited in claim 1, wherein said mechanical means is a piston.

4. Inflation apparatus as recited in claim 3, wherein said piston has a first end disposed adjacent to said outlet means, a second end disposed adjacent to said gas generating means and a shaft structurally connected to and having a diameter smaller than said first and second ends and said housing means includes an inner cylinder having an elongated aperture therein which communicates with said mechanical means and said pressurized gas and a conduit dimensionally defined by the interior surface of said housing means and the exterior surface of said cylinder and by the interior surface of said cylinder and the exterior surface of said shaft, said piston being slidably disposed in said cylinder.

5. Inflation apparatus as recited in claim 1 wherein a plurality of apertures is employed.

6. Inflation apparatus as recited in claim 5, wherein said apertures are circumferentially spaced around said housing means at substantially equal intervals and each of said apertures has substantially the same diameter.

7. Inflation apparatus as recited in claim 6, wherein said apertures collectively provide said housing with an opening having a diameter of about 1 to 2.5 inches.

8. Inflation apparatus as recited in claim 1, wherein said predetermined pressure is in the order of about 2000 to 6000 psi.

9. Inflation apparatus as recitd in claim 1, wherein said predetermined pressure is obtained within about 5 to 15 milliseconds after ignition of said gas generating material if said outlet means is not ruptured by said mechanical means.

10. In an inflation apparatus adapted to be disposed in a vehicle and having means for admixing gas generated by combustion of gas generating material with pressurized gas in a gas containing means and for releasing the combined gases through an outlet means and into an inflatable bag upon receipt of an electrical current from an impact detecting means responsive to impact of the vehicle, the improvement wherein:

a. each of said outlet means and said gas generating material is in communication with said pressurized gas;
b. said outlet means is adapted to rupture when the gas pressure exceeds a predetermined pressure; and
c. said gas releasing means includes a housing containing said gas generating material and a mechanical means, said mechanical means being disposed adjacent to said gas generating material and being operable upon combustion thereof to rupture said outlet means, whereby said gases are released from said gas containing means.

* * * * *